United States Patent [19]

Li

[11] Patent Number: 5,953,654

[45] Date of Patent: Sep. 14, 1999

[54] WIRELESS COMMUNICATIONS SYSTEM FOR IDENTIFYING UNAUTHORIZED MOBILE UNITS

[75] Inventor: Thaddeus Siu-Por Li, Calgary, Canada

[73] Assignee: Harris Corporation, Melbourne, Fla.

[21] Appl. No.: 08/742,899

[22] Filed: Nov. 1, 1996

[51] Int. Cl.[6] ..................................................... H04Q 7/38
[52] U.S. Cl. ........................ 455/411; 455/435; 455/450
[58] Field of Search .................................. 455/410, 411, 455/435, 450, 455, 551

[56] References Cited

U.S. PATENT DOCUMENTS

| | | | |
|---|---|---|---|
| 5,293,419 | 3/1994 | Hirano | 455/411 |
| 5,553,314 | 9/1996 | Grube et al. | 455/411 |
| 5,557,652 | 9/1996 | Jonsson | 455/411 |
| 5,557,654 | 9/1996 | Maenpaa | 455/411 |
| 5,765,107 | 6/1998 | Korowajczuk | 455/410 |
| 5,822,691 | 10/1998 | Hosseini | 455/410 |

*Primary Examiner*—Willis R. Wolfe
*Attorney, Agent, or Firm*—Rogers & Killeen

[57] ABSTRACT

A system for identifying the presence of unauthorized mobile units in a communications system is disclosed. The system comprises at least one base station, at least two mobile units, at least one control channel, and at least one voice channel. The base station and a mobile unit first establish a connection on a control channel. Then they re-establish the connection on a voice channel. Subsequently, and while the communication continues on the voice channel, the base station sends a signal on the control channel to all other mobile units using the same identification as the first mobile unit. If any mobile units respond to the subsequent signal on the control channel, then the base station positively identifies the presence of an unauthorized mobile unit.

8 Claims, 1 Drawing Sheet

WIRELESS COMMUNICATIONS SYSTEM FOR IDENTIFYING UNAUTHORIZED MOBILE UNITS

BACKGROUND OF THE INVENTION

The present invention is directed generally to methods for determining unauthorized use of a radio-frequency based telephone system and in particular to a method and system for determining if a unauthorized clone of a mobile telephone has been made and is in use.

In almost all wireless communications systems, a base station must determine the user of a mobile unit for billing or monitoring purposes. But without the fixed structure of a wired communications system, the base station of a wireless communications system generally must determine the user solely on the identification received from the mobile unit. In present day cellular mobile telephone systems, this identification is usually in the form of a mobile identification number (MIN) and/or an electronic serial number (ESN). Each mobile unit has associated with it a unique MIN and/or an ESN in addition to the typical "telephone dialing number". The MIN/ESN is used in the setup of communications between the control channel and the mobile unit but is generally not known or readily discernible without sophisticated electronic equipment or access to telephone company records.

To determine the user, a base station often compares the identification received from the mobile unit with the identifications of authorized mobile telephones stored in a database. The database may be stored locally at the base station or may include databases stored throughout a coverage area. Once the identified user is determined to be authorized to use the system, the base station may allow the mobile unit to receive or place a call. A mobile unit, which the base station allows to receive or place a call, is an "authorized mobile unit."

Unfortunately, it is known for detecting devices to monitor the airwaves used by mobile telephones for the purpose of detecting and intercepting the identification information associated with authorized mobile units. The intercepted identification information may then be stored into a "clone" mobile unit. Because the clone mobile unit uses the same identification data as an authorized mobile unit, a base station wrongly believe that the close unit is an authorized unit and will incorrectly allow the second mobile to receive or place a call. Significantly, the base station will bill or monitor the user of the first (authorized) mobile unit for the calls of the clone (unauthorized) mobile unit, causing considerable confusion as to the authenticity of any of the calls to or from the authorized mobile unit and permitting unbilled use of the telephone network.

In one proposed solution to this problem, a base station randomly or periodically attempts to identify two or more mobile units with the same identification. In such a system, the base station may periodically transmit an audit (or control) message on the control channel. If more than one response is received by the base station (or by other interconnected base stations), the base stations know that at least one of these mobile units is a clone unit. This proposed solution, however, does not address two additional problems: (1) most unauthorized mobile units are "turned off" when not in use; and (2) periodic or random transmissions on a control channel consumes appreciable bandwidth on the control channel. Indeed, to be effective the periodic transmission should occur fairly frequently, thus consuming more bandwidth to become more effective.

Accordingly, it is an object of the present invention to provide a novel wireless communication system for eliminating the problems and burdens of the prior art.

It is another object of the present invention to provide a novel wireless communication system for identifying unauthorized mobile units during the highest probability period that unauthorized mobile units are "turned on."

It is another object of the present invention to provide a novel wireless communication system for identifying unauthorized mobile units without overburdening the base station or the control channels.

It is another object of the present invention to provide a novel wireless communication system for identifying unauthorized mobile units when connecting a call to or from a mobile unit.

It is yet another object of the present invention to provide a novel wireless communication system for identifying unauthorized mobile units in a local loop system.

It is still another object of the present invention to provide a novel wireless communication system for identifying unauthorized mobile units in a cellular system.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
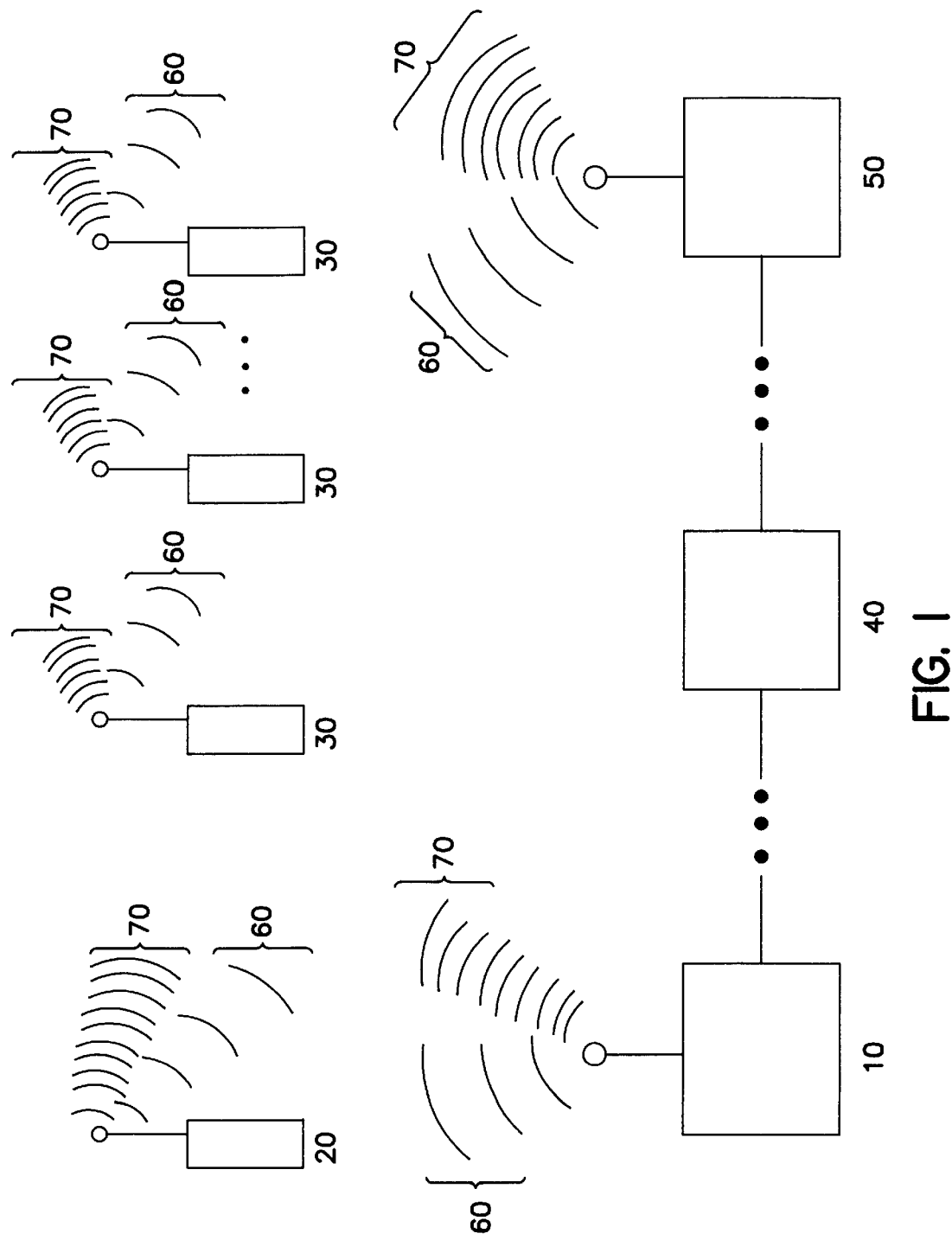
FIG. 1 shows an exemplary system for identifying unauthorized mobile units according to the principles of the invention.

With reference to FIG. 1, the system of the present invention may include a base station 10, an initial mobile unit 20, and other mobile units 30. The base station 10 communicates with the initial mobile unit 20 and with the other mobile units 30 through a plurality of channels. At least one of the channels is a control channel 60, and at least one the channels is a voice channel 70. The base station 10 may also communicate with other base stations 50 through a network 40.

In operation, the base station 10 and the initial mobile unit 20 first communicate on the control channel 60 to establish a connection on the control channel 60 and to assign a voice channel for the upcoming call. The upcoming call may be an incoming call which was received by the base station 10 for the initial mobile unit 20 or may be an outgoing call which was originated by the initial mobile unit 20 through the base station 10.

The base station 10 may subsequently cause the initial mobile unit 20 to communicate on the voice channel 70 to establish a connection on the voice channel 70. The base station 10 and the mobile unit 20 may further communicate on the voice channel 70 to validate the identification of the initial mobile unit. Alternatively, the initial mobile unit 20 may immediately commence a call on the voice channel 70 with a telephone user connected, ultimately, to the base station 10. The identification of the initial mobile unit 20 may include the mobile identification number (MIN) and/or the electronic serial number (ESN) or similar unique identifier associated with a telephone instrument or with a telephone subscriber. Upon receipt of the initial mobile unit's unique identifier, the base station may verify that the initial mobile unit 20 is authorized to place or receive calls by comparing the unique identifier to a list or table of authorized identifiers. The list or table may be stored at the base station. Alternatively, the list or portions of the list of authorized identifiers may be stored at the other base stations or at central authentication stations. Still further, the list of authorized identifications may be stored at other systems and a protocol used to inquire of the other systems whether the unique identifier is authorized by the other system to place and/or receive calls. Once the identification of the initial mobile unit is believed to be authorized (i.e., successfully compared in one of the "authorized" lists), the base station 10 may permit the telephone call to be connected through to the initial mobile unit 20.

Once the call is established to the initial mobile unit 20 (and that unit is communicating on the voice channel), the base station 10 may attempt to identify other mobile units 30 with the same identification as the initial mobile unit 20. For example, the base station 10 may send a signal on the control channel 60 to other mobile units 30. If another mobile unit 30 has the same identification as the initial mobile unit 20, that mobile unit 30 will send a signal on the control channel 60 to the base station 10.

If the base station 10 receives a signal on the control channel 60 from another mobile unit 30 in response to the signal on the control channel 60, then the base station 10 can conclude that either the initial mobile unit 10 or the other mobile unit 30 (or both) is an unauthorized mobile unit. With this information, the base station may take further action to determine which mobile unit is unauthorized, to disconnect the unauthorized mobile unit, and to contact the authorized mobile unit.

The message sent to the other mobile units 30 on the control channel 60 may also be sent by other base stations in the same system or in systems in communication with the base station 10. Because the unique identifier is normally unique throughout a region (or preferably throughout the world), there should not be a response from a mobile unit 30 anywhere in the region (or the world) to the message sent on the control channel while the initial mobile unit 20 remains on the voice channel 70.

It is to be understood that the embodiments may be used in various wireless communications systems, such as local loop systems and cellular systems.

For example, in a local loop system, the base station 10 is a local loop switching center, the initial mobile unit 20 and the other mobile units 30 are local loop phones, and the base station 50 is another local loop switching center at a remote location.

For further example, in a cellular system, the base station 10 is a mobile telephone switching center (MTSC), the initial mobile unit 20 and other mobile units 30 are cellular phones, the connector 40 is a public telephone switching network (PTSN), and the other base station 50 is another MTSC at a remote location.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for identifying the presence of unauthorized mobile units in a communications system comprising a base station and a plurality of mobile units each with an identification, wherein said base station communicates with said mobile units over a plurality of channels, comprising the steps of:

(a) designating one or more channels as a control channel;
   (b) designating one or more channels as a voice channel;
   (c) establishing a connection on a control channel between a base station and a mobile unit;
   (d) assigning a voice channel to said mobile unit for a call by communicating on said control channel between said base station and said mobile unit;
   (e) establishing a connection on said voice channel between said base station and said mobile unit;
   (f) validating the identification of said mobile unit by communicating on said voice channel between said base station and said mobile unit; and
   (g) while said mobile unit communicates on said voice channel, identifying any mobile units with the same said identification as said mobile unit by communicating on a control channel from said base station.

2. The method of claim 1, wherein said step of identifying any mobile units with the same said identification as said mobile unit comprises the steps of:

(h) sending a signal on a control channel to any mobile units with the same identification as said mobile unit; and
   (i) monitoring said control channel for a response from any said mobile units.

3. A method for identifying the presence of unauthorized mobile units in a communications system comprising a base station and a plurality of mobile units each with an identification, wherein said base station communicates with said mobile units over a plurality of channels, comprising the steps of:

(a) designating one or more channels as a control channel;
   (b) designating one or more channels as a voice channel;
   (c) validating the identification of a mobile unit by communicating on a voice channel between a base station and a mobile unit; and
   (d) identifying any mobile units with the same said identification as said mobile unit by communicating on a control channel from said base station while said mobile unit communicates on said voice channel.

4. The method of claim 3, wherein said step of identifying any mobile units with the same said identification as said mobile unit comprises the steps of:

(e) sending a signal on a control channel to any mobile units with the same identification as said mobile unit; and
   (f) monitoring said control channel for a response from any said mobile units.

5. A method for identifying the presence of unauthorized mobile units in a communications system comprising a plurality of base stations and a plurality of mobile units each with an identification, wherein said base stations communicates with said mobile units over a plurality of channels, comprising the steps of:

(a) designating one or more channels as a control channel;
   (b) designating one or more channels as a voice channel;
   (c) establishing a connection on a control channel between a base station and a mobile unit;
   (d) assigning a voice channel to said mobile unit for a call by communicating on said control channel between said base station and said mobile unit;
   (e) establishing a connection on said voice channel between said base station and said mobile unit;

(f) validating the identification of said mobile unit by communicating on said voice channel between said base station and said mobile unit; and (g) while said mobile unit communicates on said voice channel, identifying any mobile units with the same said identification as said mobile unit by communicating on a control channel from one or more base stations.

6. The method of claim 5, wherein said step of identifying any mobile units with the same said identification as said mobile unit comprises the steps of:

(h) sending a signal on a control channel to any mobile units with the same identification as said mobile unit; and (i) monitoring said control channel for a response from any said mobile units.

7. A communications system for identifying the presence of unauthorized mobile units, comprising:

(a) a plurality of mobile units, wherein each said mobile unit has an identification;

(b) a base station, wherein said base station communicates with said mobile units over a plurality of channels, wherein at least one channel is a control channel and at least one channel is a voice channel;

(c) means for establishing a connection on a control channel between said base station and said mobile unit;

(d) means for assigning a voice channel to said mobile unit for a call while communicating on said control channel;

(e) means for establishing a connection on said voice channel between said base station and said mobile unit;

(f) means for validating the identification of said mobile unit while communicating on said voice channel; and (g) means for identifying any mobile units with the same said identification as said mobile unit while communicating on a control channel and while said mobile unit communicates on said voice channel.

8. A communications system of claim 7, wherein said means for identifying any mobile units with the same said identification as said mobile unit further comprises:

(h) means for sending a signal on a control channel to any mobile units with the same identification as said mobile unit; and (i) means for monitoring said control channel for a response from any said mobile units.

* * * * *